Oct. 14, 1952     O. E. DEVER     2,613,892
TRACK TREAD LANDING GEAR WITH PREROTATION MEANS
Filed Oct. 20, 1949
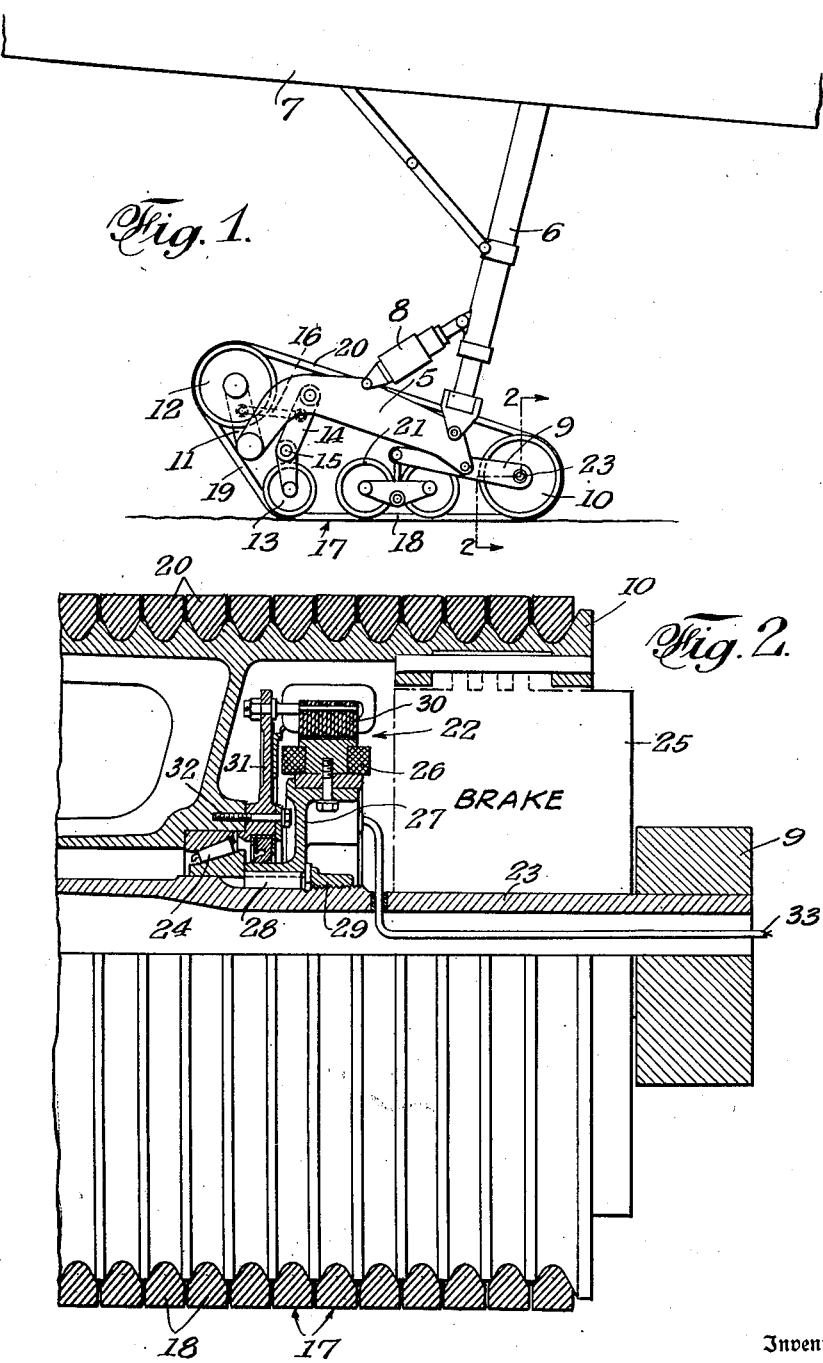
Inventor
OTTO E. DEVER
By C. G. Stratton
Attorney Patented Oct. 14, 1952

2,613,892

UNITED STATES PATENT OFFICE 2,613,892

TRACK TREAD LANDING GEAR WITH PREROTATION MEANS

Otto E. Dever, Burbank, Calif.

Application October 20, 1949, Serial No. 122,535

3 Claims. (Cl. 244—100)

This invention relates to track tread landing gear with prerotation means for aircraft.

Landing gear of the indicated type is at rest when in the air, and is actuated upon engagement with the ground. At the instant of impact the track tread is subjected to considerable shock and wear resulting from the sudden rotation imparted thereto on landing. Such shock and wear are quite a material factor in a wheel and are a considerably greater deleterious factor in track tread gear, as can be well understood.

In addition, when initially engaging the ground, the leading or oncoming portion of the tread is subjected to accumulations of dirt, mud, etc., that pile up in front of the tread and are thereby forced into and through the spaces between the belts that comprise the tread. The belt grooves are thereby clogged, resulting in additional strains on the track belts.

Also, a track tread gear, while in the air, is substantially unstressed and is capable of being moved or rotated with little power, whereas when the same flattens out under the impact of landing, a high torque force is necessary to move the tread from its state of rest while in the air to roll or rotate during movement of the aircraft along the ground. Consequently, a conventional track tread gear is quite inefficient because tractive movement is instituted only upon landing, often resulting in disruption of the tread and, due to the static inertia thereof, may cause the aircraft to tip over on its nose. Under certain conditions, such as a soft landing terrain, a track tread type of landing gear is preferable to ordinary landing wheels. However, because of the difficulties hereinbefore stated, the track tread type of landing gear has not been found very desirable.

An object of the present invention is to provide means, in combination with a track tread landing gear, for pre-rotating the tread of said gear while in the air, to obviate the aforementioned faults in such gear.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a side elevational view of a track tread landing gear to which the present invention is applied.

Fig. 2 is an enlarged broken sectional view as taken on line 2—2 of Fig. 1.

With particular reference to Fig. 1, the landing gear comprises a main arm or frame means 5 that is carried by a strut 6 from the fuselage 7 of an aircraft, and an extensible brace strut 8, in triangular arrangement, connecting strut 6 with said arm 5, which arm thereby is mounted for pivotal movement relative to strut 6.

One end of arm 5, by means of a link 9, carries a grooved pulley 10. Somewhat similarly, the other end of said arm, by means of a link 11, carries a similar pulley 12. A third, smaller pulley 13, through the medium of a link 14 provided with a pivot 15 intermediate its length, is carried by arm 5 between link 11 and the point of connection of brace strut 8. A link 16 connects links 11 and 14.

Around the three pulleys 10, 12 and 13, is trained a plurality of somewhat elastic belts 17 that comprise the track of the landing gear. The centers of said pulleys are on the apices of a scalene triangle. The belt track has a generally lower horizontal run 18, an angularly and forwardly upwardly directed run 19 extending from the forward end of run 18, and a connecting run 20 between pulleys 10 and 12 that completes the endless form of the track. A pair of traction pulleys 21, engaged with run 18 of the track, is generally provided, the same being carried by an inner extension of link 9.

When in the air, there are no forces in the above-described landing gear that act to tauten the track, and said track, therefore, is reasonably slack, and little rotative force applied to any of the pulleys 10, 12 or 13 is then needed to institute rotation of the track. In the slack condition of the gear, link 14 seeks a pendent position and, through link 16, draws link 11 and pulley 12 toward the right in Fig. 1. When the gear is on the ground, however, link 14 folds on its pivot 15 in a direction to push link 16 and the latter, through link 11, moves pulley 12 in a direction away from pulley 10 and thereby tautens the track.

It will be evident that such tautening occurs at the instant of contact of the track with the ground and strains said track frequently to the point of rupture. Another factor that acts to tauten the track unduly comprises a built up pile of dirt and/or mud on the ground in the path of movement of the landing gear, which exerts a force against the lower portion of run 19 so that the same is wedged into the grooves of pulley 13, and the run 19 is additionally stretched out of its normal straight-line disposition.

The above-described gear is intended as generally typical of track tread landing gear in which the endless track is taut only when the gear is on the ground.

According to the invention, either (or both) pulley 10 or 12 is provided with low starting-torque means 22 for instituting rotation of track 17 while the aircraft is in the air and to thereby eliminate the above-enumerated faults. In this case, wheel 10, which is the trailing wheel of the gear, is equipped with means 22 so that track run 18 will be pulled in the direction that will cause forward movement of the aircraft on the ground. In the drawing, said movement is toward the left. Without such torque means 22, the track run 18 would be pushed upon the aircraft touching the ground with a consequent tendency of the aircraft to "nose over."

With more particular reference to Fig. 2, the link 9 fixedly carries an axle 23 which, by means of a suitable bearing or bearings 24, mounts pulley 10 for rotation of the latter. A suitable brake, suggested at 25, interconnects said axle and pulley for controlling the speed of rotation of the latter in the usual way for such devices.

The means 22 is shown as a low starting torque electric motor that has a fixed annular field 26 carried by a circular flange 27, fixed by means of a key 28 to axle 23 and held endwise by a nut 29 against bearing 24. The armature 30 of said motor is outward of field 26 and is carried by a plate 31 that is affixed by screws 32 to pulley 10. Commutation for the motor 22 is omitted from the drawing since the same may be designed along the lines taught in my Patent No. 2,430,163. Current is brought to the motor through suitable conductors 33 through a hollow axle 23.

Through the means thus provided, current can be brought to field 26 to energize the same and to rotate pulley 10 and thus rotate belt track 17. With such pre-rotation of the track, an aircraft can be landed with the track moving at a speed approximating the landing speed to remove all undue forces tending to disrupt the track. It is immaterial that the track is tautened at the instant of contact, since the same is already in motion and will provide for a smooth, safe landing that cannot be obtained with an initially static track.

The actuating means 22 is not designed to have sufficient horsepower to drive the track tread gear after the track has been tautened, but only sufficient power to drive the track when it is in the air and while the track tread gear freely rotates.

While the invention that has been illustrated and described is now regarded as the preferred embodiment, the construction is, of course, subject to modifications without departing from the spirit and scope of the invention. It is, therefore, not desired to restrict the invention to the particular form of construction illustrated and described, but to cover all modifications which may fall within the scope of the appended claims.

Having thus described my invention, what I claim and desire to secure by Letters Patent is:

1. In landing gear for aircraft, a plurality of pulleys, one of which trails with respect to the others during forward flight, endless belt means trained around the pulleys to form a track, frame means for the landing gear adapted to be connected with the strut of an aircraft, linkage interconnecting the frame means with at least one of the pulleys to move the latter outwardly from the frame means to tighten the track on the pulleys when the track engages the ground, and electric motor means embodied within the trailing pulley for instituting rotation thereof and of the track before the track engages the ground, said trailing pulley rotating in a direction to pull on that portion of the track which engages the ground.

2. In landing gear for aircraft, a plurality of pulleys, one of which trails with respect to the others during forward flight, endless belt means trained around the pulleys to form a track, frame means for the landing gear adapted to be connected with the strut of an aircraft, linkage interconnecting the frame means with at least one of the pulleys to move the latter relative to the frame means from a position in which the track is in a relatively less stretched condition to a position in which the track is in a relatively greater stretched condition, and electric motor means embodied within the trailing pulley for instituting rotation thereof and of the track while the track is in the relatively less stretched condition, said trailing pulley rotating in a direction to pull on that portion of the track which engages the ground, the linkage being arranged to move at least one of the pulleys to the second-mentioned position to place the track in a relatively greater stretched condition by engagement of the track with the ground.

3. In an aircraft landing gear having three pulleys in scalene-triangular arrangement and having an endless track trained around said three pulleys, two of said pulleys being in substantially horizontal alignment and one of said two pulleys being at the rear of the gear and trailing with respect to the others during forward flight, that portion of the track extending between said two horizontally aligned pulleys being substantially horizontal and adapted to engage the ground upon landing of the aircraft, the improvement that comprises a low starting-torque motor embodied in and driving the mentioned trailing pulley in a direction to pull on said horizontal ground-engaging portion of the track.

OTTO E. DEVER.

REFERENCES CITED

The following references are of record in the file of this patent:

UNITED STATES PATENTS

| Number | Name | Date |
|---|---|---|
| 2,281,351 | Dowty | Apr. 28, 1942 |
| 2,416,183 | Kraft | Feb. 18, 1947 |
| 2,430,163 | Dever | Nov. 4, 1947 |
| 2,472,641 | Wood | June 7, 1949 |
| 2,497,880 | Gassner | Feb. 21, 1950 |
| 2,505,770 | Hill | May 2, 1950 |

OTHER REFERENCES

Keyser, "Prerotation of Landing Gear Wheels," Aug. 18, 1948, 9 pages, pages 6 and 9 cited.